US012736100B2

(12) United States Patent
Caule et al.

(10) Patent No.: US 12,736,100 B2
(45) Date of Patent: Sep. 15, 2026

(54) VENTILATION SYSTEM FOR AIRCRAFT WHEEL AND WHEEL ASSEMBLY INCLUDING SUCH A SYSTEM

(71) Applicant: SAFRAN VENTILATION SYSTEMS, Blagnac (FR)

(72) Inventors: Patrice Caule, Moissy Cramayel (FR); Florent Challas, Moissy Cramayel (FR); Thierry Fontalbat, Moissy Cramayel (FR); Franck Verdier, Moissy Cramayel (FR); Rémi Estanove, Moissy Cramayel (FR)

(73) Assignee: SAFRAN VENTILATION SYSTEMS, Blagnac (FR)

( * ) Notice: Subject to any disclaimer, the term of this patent is extended or adjusted under 35 U.S.C. 154(b) by 663 days.

(21) Appl. No.: 18/006,103

(22) PCT Filed: Jul. 12, 2021

(86) PCT No.: PCT/FR2021/051290
§ 371 (c)(1),
(2) Date: Jan. 19, 2023

(87) PCT Pub. No.: WO2022/018351
PCT Pub. Date: Jan. 27, 2022

(65) Prior Publication Data

US 2023/0349436 A1 Nov. 2, 2023

(30) Foreign Application Priority Data

Jul. 20, 2020 (FR) ....................................... 2007597

(51) Int. Cl.
*F16D 65/847* (2006.01)
*B64C 25/34* (2006.01)
(Continued)

(52) U.S. Cl.
CPC ............ *F16D 65/847* (2013.01); *B64C 25/34* (2013.01); *F04D 25/08* (2013.01); *F04D 29/522* (2013.01); *F04D 29/703* (2013.01)

(58) Field of Classification Search
CPC ....... F16D 65/847; B64C 25/34; B64C 25/36; F04D 25/08; F04D 25/703; F04D 29/029;
(Continued)

(56) References Cited

U.S. PATENT DOCUMENTS 3,217,844 A 11/1965 Nelson et al.
3,251,437 A * 5/1966 Moyer .................... F16D 55/40
188/264 AA (Continued)

FOREIGN PATENT DOCUMENTS

CN 209051582 U * 7/2019 ............. B64C 25/36
DE 2109563 A1 * 9/1972 ............. B64C 25/40

(Continued)

OTHER PUBLICATIONS

FR2941438A1_GoogleTranslationEnglish (Year: 2010).*

(Continued)

*Primary Examiner* — S. Joseph Morano
*Assistant Examiner* — Eva L Comino
(74) *Attorney, Agent, or Firm* — CUSHMAN PARTNERS, LLC

(57) ABSTRACT

A ventilation system for mounting in an aircraft wheel along a central axis and including a rotor fitted with a plurality of blades and housed between a shroud support and a guard grid, the shroud support including a structural element juxtaposed with an aeraulic element, the structural element being made of metal and adapted to interlock into the wheel and support the rotor, the aeraulic element being made of plastic or resin and adapted to direct an air flow towards to the rotor.

10 Claims, 8 Drawing Sheets

(51) Int. Cl.

| | |
|---|---|
| ***F04D 25/08*** | (2006.01) |
| ***F04D 29/52*** | (2006.01) |
| ***F04D 29/70*** | (2006.01) |

(58) Field of Classification Search

CPC .... F04D 29/164; F04D 29/522; F04D 29/541; F04D 29/646; F04D 29/703; Y02T 50/80; F05D 2250/51; F05D 2300/43

See application file for complete search history.

(56) References Cited

U.S. PATENT DOCUMENTS

| | | | | |
|---|---|---|---|---|
| 3,301,357 | A * | 1/1967 | Cleminson | B60B 19/10 301/6.2 |
| 2008/0078866 | A1* | 4/2008 | Parker | B60B 7/04 244/100 R |
| 2010/0187897 | A1* | 7/2010 | Caule | F16D 65/78 301/6.3 |
| 2017/0292531 | A1* | 10/2017 | Snyder | F02C 7/14 |

FOREIGN PATENT DOCUMENTS

| | | | | |
|---|---|---|---|---|
| DE | 10 2014 111055 | A1 | 2/2016 | |
| DE | 2014111055 | A1 * | 2/2016 | F04D 29/66 |
| EP | 1547812 | A1 * | 6/2005 | B60B 7/04 |
| FR | 2941438 | A1 * | 7/2010 | F16D 65/78 |
| FR | 3037998 | A1 * | 12/2016 | F01D 25/14 |
| FR | 3074236 | A1 * | 5/2019 | F04D 29/441 |
| WO | WO-2009138581 | A2 * | 11/2009 | F02C 6/08 |

OTHER PUBLICATIONS

DE-2109563_A_GoogleTranslate (Year: 1972).*

WO-2009138581-A2_espace.net translation (Year: 2009).*

International Search Report as issued in International Patent Application No. PCT/FR2021/051290, dated Oct. 4, 2021.

* cited by examiner

X
166
121
121a
120
121b
126
40
140
141
143
144
170
160
150
30
X

VENTILATION SYSTEM FOR AIRCRAFT WHEEL AND WHEEL ASSEMBLY INCLUDING SUCH A SYSTEM

CROSS-REFERENCE TO RELATED APPLICATIONS

This application is the U.S. National Stage of PCT/FR2021/051290, filed Jul. 12, 2021, which in turn claims priority to French patent application number 2007597, filed Jul. 20, 2020. The content of these applications are incorporated herein by reference in their entireties.

TECHNICAL FIELD OF THE INVENTION

The present invention relates to a ventilation system for aircraft wheel intended to cool a device for braking the wheel. The invention also relates to a wheel assembly including a braking device cooled by such a ventilation system.

The invention finds applications in the field of aircraft landing gear and especially in cooling of the braking device of these aircraft.

TECHNOLOGICAL BACKGROUND TO THE INVENTION

Aircraft landing gear generally include several wheels each provided with a braking device. It is known that a braking device heats up when actuated. Aircraft braking devices experience very high heating when the aircraft lands, due in particular to the speed of the aircraft when it hits the ground and due to its mass. Not only can this overheating present a risk to the integrity of the braking system, but in addition it has an effect on the profitability of the aircraft. Indeed, the turnaround time of an aircraft, that is, the time during which it has to remain on the ground before it can take off again, is conditioned by cooling of the landing gear braking devices. For example, an aircraft cannot leave its parking position if the temperature of the brake discs exceeds 300° C. in order to prevent them from breaking in the event of an emergency landing. Yet, the shorter is the turnaround time of an aircraft, the more profitable is the aircraft.

To limit the turnaround time of aircraft, it is known to place a fan on the ground, in the vicinity of the aircraft wheels. It is also known to have a forced ventilation system on board. This forced ventilation system is usually housed within each wheel of the landing gear.

Ventilation systems for aircraft wheels are known, especially dedicated to the cooling of landing gear braking devices. An example of such a ventilation system is schematically represented in FIGS. 1 and 2. This ventilation system 11 is generally mounted about a shaft 40 of axis XX, driven by a motor 30, for example an electric motor. The ventilation system 11 generally includes a rotor 14 provided with blades intended to stir an air flow. It also includes a shroud support 15 and a guard grid 12 mounted to either side of the rotor 14 along the axis XX.

However, current ventilation systems are relatively heavy and relatively noisy. For example, current ventilation systems for single-aisle aircraft, such as for example the A319, A320 or A330, weigh in the order of 6.5 kg and generate a noise level in the order of 100 dB (measured in terms of overall acoustic pressure).

Recently, new airport standards have been issued that aim at limiting environmental noise when aircrafts are on the ground, in the parking area or moving around on the Tarmac®. These standards aim at limiting the noise of an aircraft on the ground to 80 dB, this noise level being measured at the periphery of the aircraft, allowing for an intrinsic noise of approximately 85 dB. To date, all known techniques for reducing the noise generated by a ventilation system consist in adding components resulting in making the system heavier. Yet, in aeronautics, it is constant practice to try to limit or reduce the mass of aircraft.

There is therefore a real need for a ventilation system that allows a gain in noise level without increasing the mass of the system.

SUMMARY OF THE INVENTION

In order to address the problems discussed above of reducing the noise level generated by ventilation systems without increasing the mass of said system, the applicant provides a ventilation system in which the shroud support is divided into two elements manufactured with different materials, one of the elements being lightened, the two elements being formed so as to improve aeraulic flow of the system.

According to a first aspect, the invention relates to a ventilation system for mounting in an aircraft wheel along a central axis and including a rotor fitted with a plurality of blades and housed between a shroud support and a guard grid. This ventilation system is characterised by the fact that the shroud support includes a structural element juxtaposed with an aeraulic element, the structural element being made of metal and adapted to interlock into the wheel and support the rotor, the aeraulic element being made of plastic and adapted to direct the air flow towards the rotor.

This ventilation system, by directing the air flow, makes it possible to reduce the noise level generated. Furthermore, by structurally modifying certain elements, it allows a gain in the mass of the system. The modifications to the ventilation system, compared to the state of the art, also allow an improvement in performance.

In addition to the characteristics just discussed in the preceding paragraph, the ventilation system according to one aspect of the invention may have one or more additional characteristics among the following, considered individually or in any technically possible combination:

- the rotor includes a band extending circularly at a radial end of the blades, said band including a crenelated surface capable of impeding passage of the air flow, this crenelated surface including at least one crenelation.
- the structural element and the aeraulic element of the shroud support are integral with each other.
- the structural element includes an internal ring, an external ring and a plurality of arms distributed over the circumference of the internal ring and connecting the internal ring to the external ring, the internal and external rings and the arms having rounded contours free of ridges.
- the aeraulic element has a flattened crown shape comprising, at its centre, a flanged edge adapted to interlock the band of the rotor.
- the aeraulic element includes a first, substantially planar, face capable of being joined to the external ring of the structural element.
- the guard grid includes a shell provided with a first and a second set of ports, the first set of ports facing the rotor blades and adapted to let the air flow pass, the second set of ports facing the central hub of the rotor and adapted to reduce the mass of the guard grid.

the guard grid includes a flanged edge extending axially at an outer end of the shell, this flanged edge including attachment means for attaching said guard grid to the shroud support.

It includes a quarter-turn locking device mounted to the guard grid and the aeraulic element for attaching said guard grid to the aeraulic element of the shroud support.

Another aspect of the invention relates to a wheel assembly including a wheel mounted to a rim and positioned about a central axis, a device for braking the wheel and a ventilation system disposed along the central axis for cooling the braking device by circulating an air flow, the ventilation system being in accordance with that defined above.

Advantageously, the structural element of the shell support is integral with the rim of the wheel.

In the remainder of the description, the term "internal or inner" will be understood to mean the element or portion of element closest to the central axis of the system and the term "external or outer" will be understood to mean the element or portion of element furthest from said central axis.

BRIEF DESCRIPTION OF THE FIGURES

Further advantages and characteristics of the invention will become apparent from the following description, illustrated by the figures in which.

DETAILED DESCRIPTION

One exemplary embodiment of a ventilation system for a single-aisle aircraft wheel, configured to generate a noise level compatible with the new airport standard, is described in detail hereafter, with reference to the attached drawings. This example illustrates the characteristics and advantages of the invention. It is however reminded that the invention is not limited to this example.

In the figures, identical elements are marked by identical references. For reasons of legibility of the figures, size scales between the elements represented are not respected.

Figure 1:
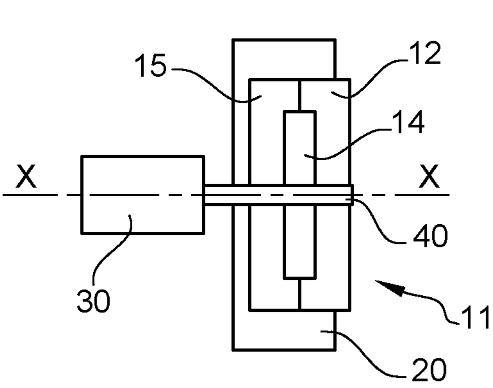
FIG. 1, already described, represents a schematic cross-sectional view of a part of a wheel assembly provided with a ventilation system according to prior art.
Figure 3:
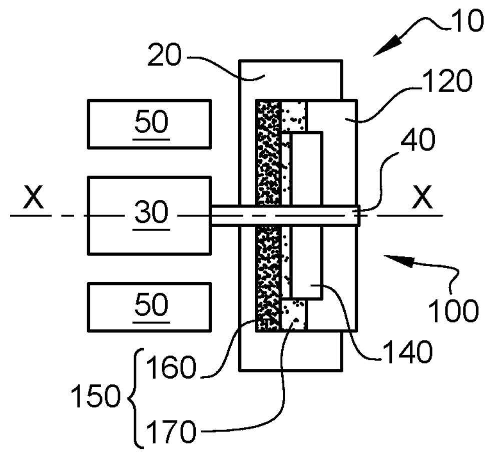
FIG. 3 represents a schematic cross-sectional view of a part of a wheel assembly provided with a ventilation system according to the invention.
Figure 2:
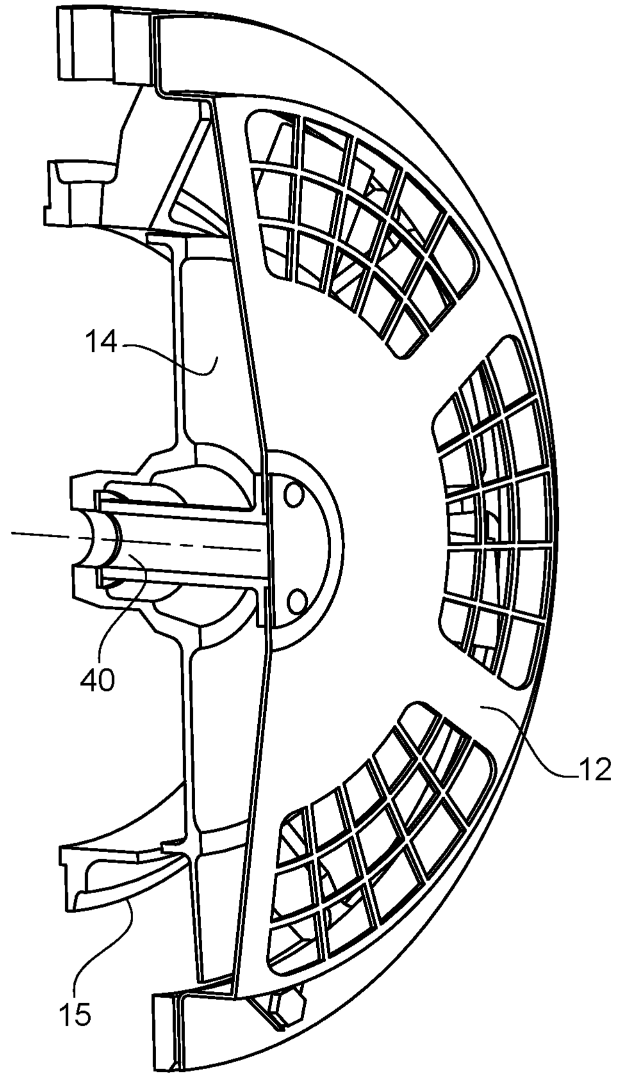
FIG. 2, already described, represents a cross-sectional view of a ventilation system according to prior art.
Figure 4:
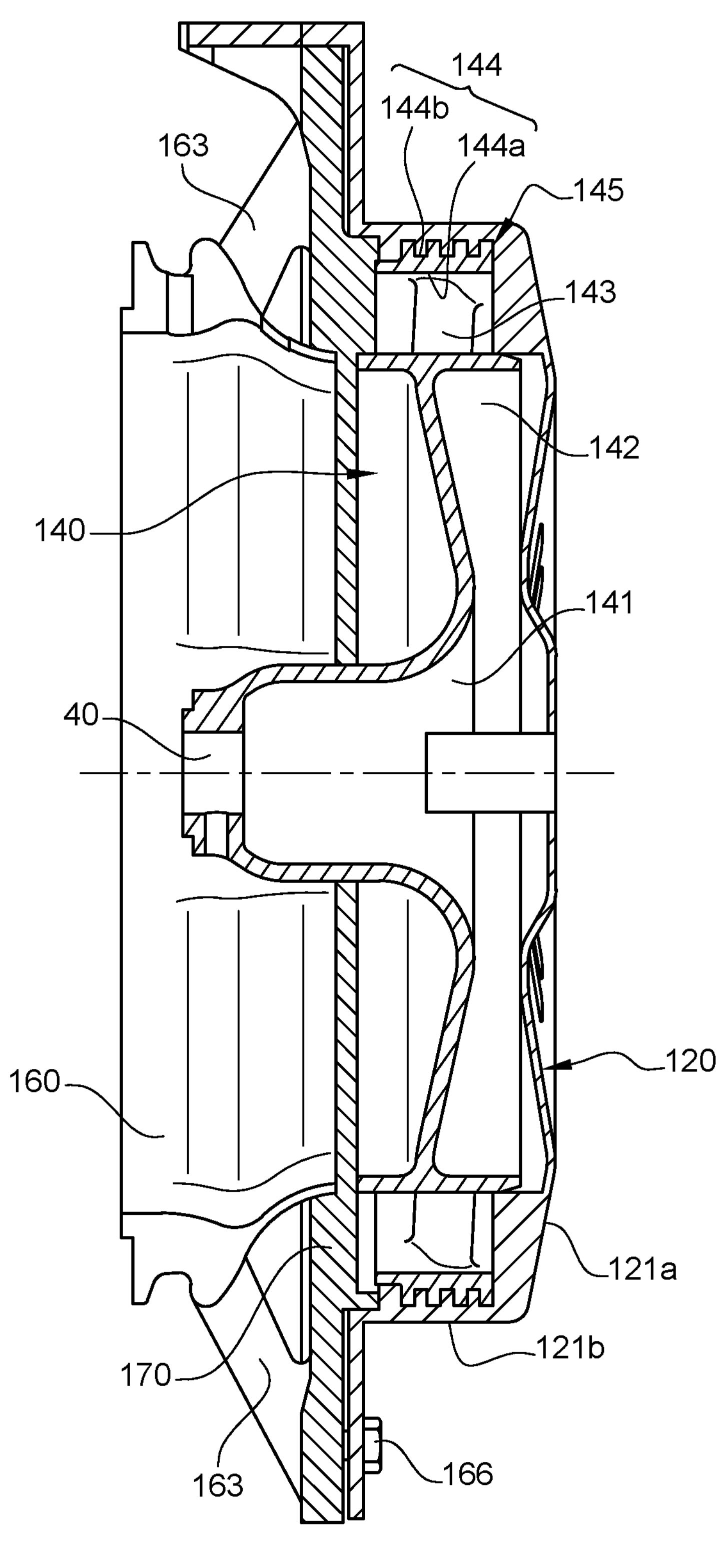
FIG. 4 represents a cross-sectional side view of the ventilation system according to the invention.

A schematic example of an aircraft wheel assembly according to the invention is represented in FIG. 3. This wheel assembly 10 is provided with the ventilation system 100 according to the invention, an example of which is represented in FIG. 4. This wheel assembly 10 includes a rim 20 around which is mounted a tyre, not represented in the figure, and within which the ventilation system 100 is mounted. This ventilation system 100, mounted along the central axis XX, around the shaft 40, is rotatably driven by the electric motor 30 in order to suck the hot air flow coming from the braking device 50.

The ventilation system 100 includes a shroud support 150 and a guard grid 120 mounted to either side of a rotor 140. The rotor 140 is mounted integral with the shaft 40 between the shroud support 150, located internally to the wheel, and the guard grid 120, partially located externally to the wheel.

The shroud support 150 includes a structural element 160 and an aeraulic element 170, juxtaposed and integral with each other. The structural element 160 is a metal piece housed in the rim 20 and whose role is especially to ensure that the ventilation system is maintained in the wheel, whatever the stresses of the wheel and in particular the vibratory stresses. The aeraulic element 170 is a plastic piece, attached to the structural element 160 and adapted to receive the rotor 140.

Figure 6:
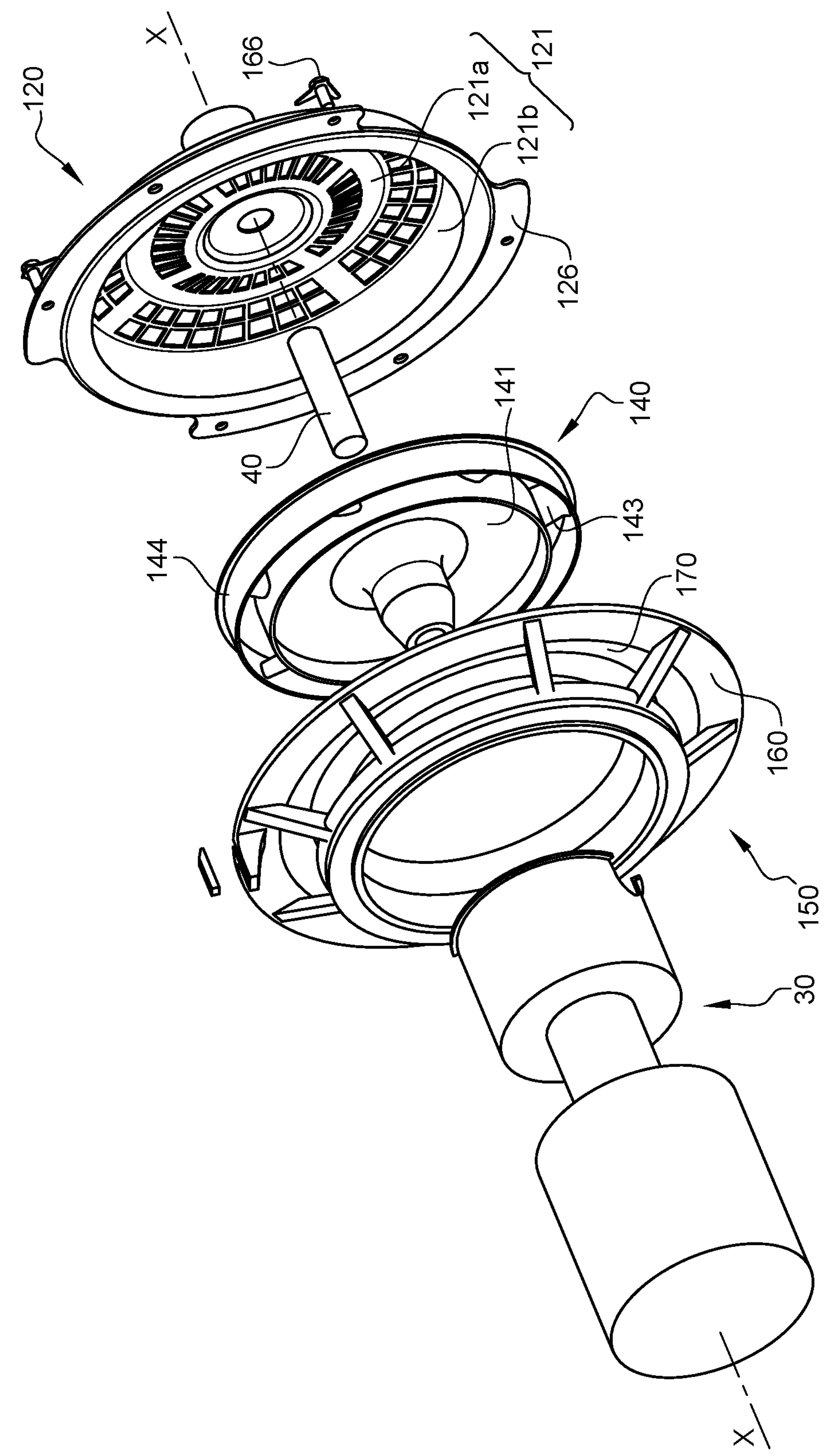
FIG. 6 represents an exploded perspective view of the ventilation system according to the invention, mounted to an electric motor.

An example of the rotor 140 is represented in a side cross-sectional view in FIG. 4 and in a perspective view in FIG. 6. This rotor 140, manufactured for example from a fibre filled plastic material, comprises a central hub 141 mounted to the shaft 40 of the wheel assembly and radially bordered by a skirt 142. It also includes a plurality of blades 143 which extend radially from the skirt 142 to a band 144. The band 144 is circular and extends coaxially to the skirt 142, at the outer end of the blades 143. The blades 143 are thus integral with the skirt 142, at their inner end (that is, the end closest to the central axis XX), and integral with the band 144 at their outer end (that is, the end furthest from said central axis XX).

The band 144 has a ring shape positioned at the outer end of the blades 143. It includes an internal surface **144*a* and an external surface 144*b*, the internal surface being in contact with the blades 143, the external surface being in contact, as explained below, with the guard grid 120 and the aeraulic element 170. The external surface 144*b* is crenelated and forms a labyrinth 145 providing axial head losses. This labyrinth 145 is formed by a single crenelation or by several successive crenelations, for example from one to five crenelations, which provide a barrier to the air flow in the directions parallel to the central axis XX so as to favour passage of air at the blades 143, between the skirt 142 and the inner surface 144*a* of the band. By minimising the air recirculation flow rate on the external surface of the rotor 140, the band 144 with its labyrinth 145** results in increasing the performance of the ventilation system while reducing the noise level.

Figure 7:
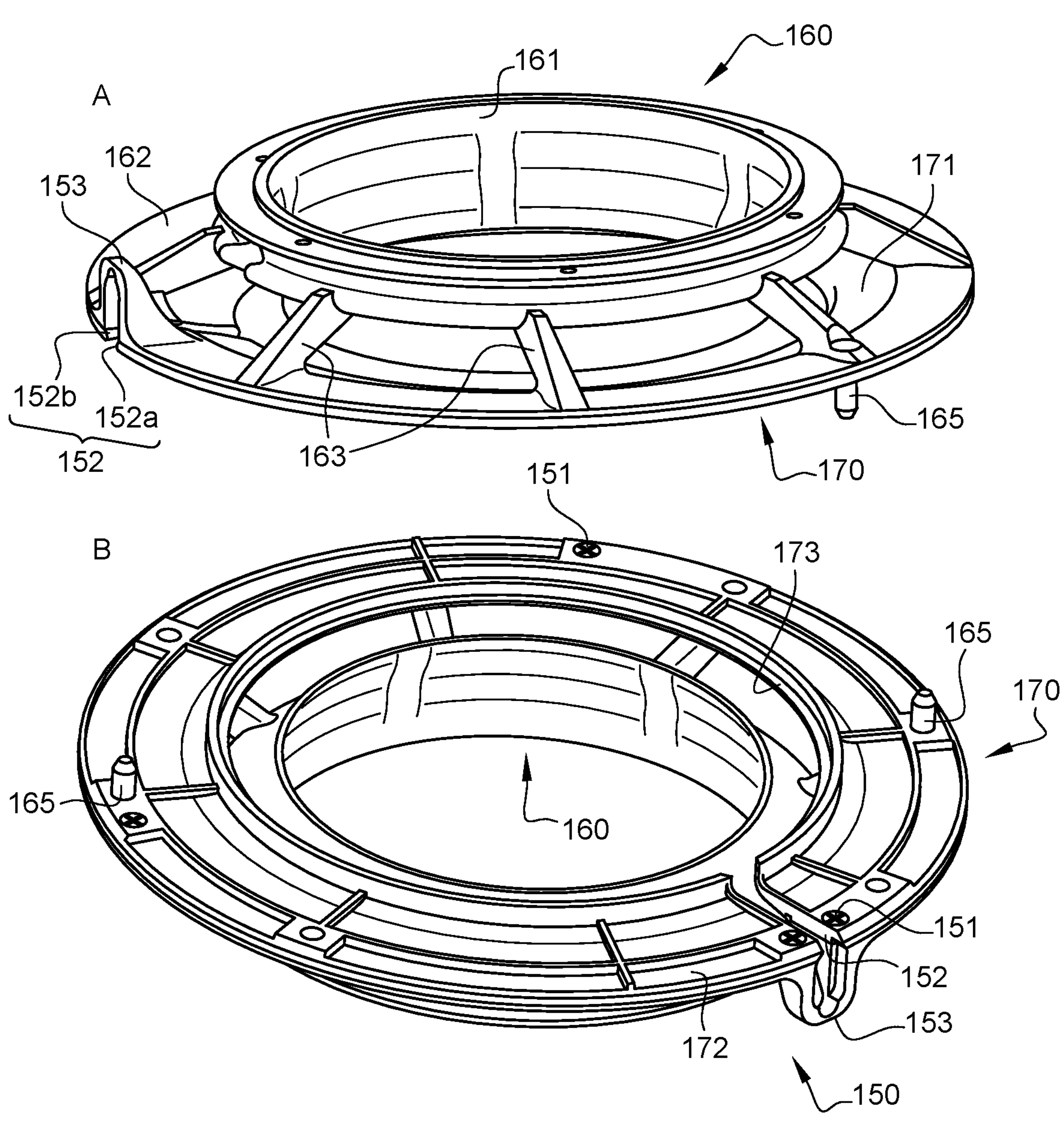
FIG. 7 represents a back view and a front view, in perspective, of the shroud support according to the invention.
Figure 8:
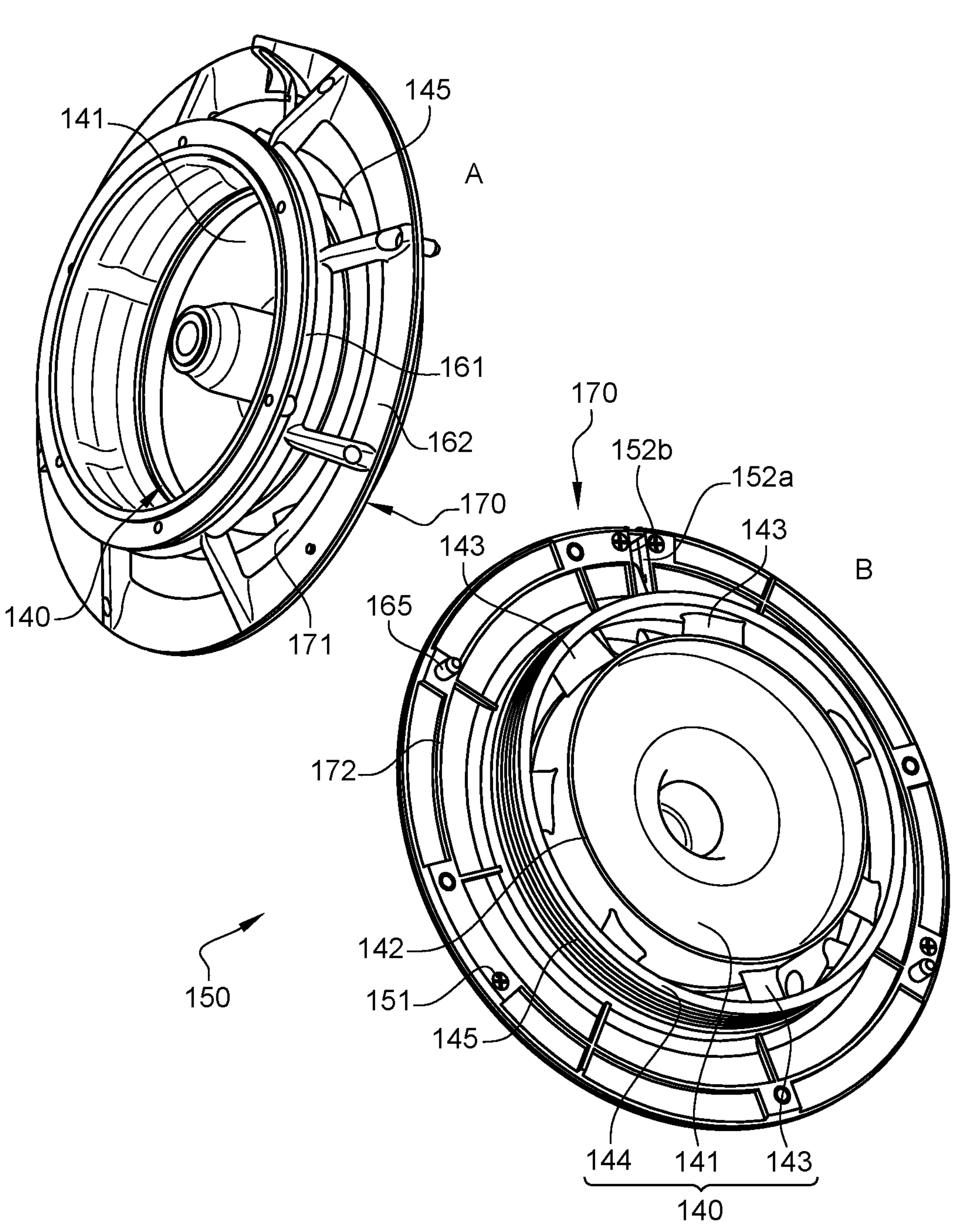
FIG. 8 represents a front perspective view and a rear perspective view of the shroud support of FIG. 7, mounted to the casing.

The shroud support 150, an example of which is represented in FIGS. 7 and 8, is formed by two distinct elements 160, 170, attached to each other, for example by a set of screws 151, as represented in parts B of FIGS. 7 and 8, or by overmoulding. One of these elements, referred to as a structural element 160, is designed to be an integral part of the structure of the wheel assembly. For this, this structural element 160 is made of metal and includes an internal ring 161, an external ring 162 and a plurality of arms 163 connecting the internal ring to the external ring. The internal ring 161 has a circumferential shape adapted to allow insertion of the structural element into the rim 20 of the wheel assembly. This circumferential shape may be identical to the part of the shroud support of prior art provided for insertion into the rim. The external ring 162 has a flat ring shape with an inner diameter greater than the outer diameter of the internal ring 161. Several arms 163, integral with the two internal 161 and external 162 rings, are distributed over the circumference of said rings to ensure a certain rigidity to the structure while limiting its mass. The arms and the rings can be manufactured as a single piece; rather, they can be manufactured separately and secured to each other by welding, brazing or any other known means for attaching metal parts. The internal 161 and external 162 rings, as well as the arms 163, have rounded contours (or external lines), free of ridges, to allow optimal circulation of the air flow and thus improve the aeraulic flow of the structural element 160. In other words, the shapes of the internal ring 161, the external ring 162 and the arms 163 are dimensioned to limit losses and to optimise the air flow entering the rotor 140.

The aeraulic element 170 of the shroud support 150 is a flattened crown-shaped element whose role is to receive the rotor 140 and to conduct the air flow towards the wheel. For this, the aeraulic element 170 includes a first face 171 and a second face 172, the first face being in contact with the structural element 160, the second face facing the guard grid 120. The second face 172 may include an anfractuous surface, provided with cavities and crenulations ensuring a gain in mass. The first face 171 includes a substantially planar surface, adapted to be joined to the external ring 162 of the structural element 160 with continuity between the surfaces in contact with the air in order to ensure the guidance of the air flow and limit losses. In addition, the aeraulic element 170 includes, at its centre, a flanged edge 173 adapted to interlock the band 144 of the rotor. This flanged edge 173 may partially interlock around the band 144, for example up to the first crenelation of the labyrinth 145. By "interlock" it is meant that the flanged edge 173 surrounds a portion of the band 144, that is, it wraps exactly over the circumference of the band 144 over a predefined width of said band, for example from the end of the band to the first crenelation of the labyrinth 145.

As the aeraulic element 170 does not have a structural role, it may be manufactured from plastic, for example fibrous or non-fibrous PEEK (Polyetheretherketone), or from a resin for example based on amorphous thermoplastic Polyetherimide such as ULTEM®. Indeed, plastics and resins have the advantage of being lighter than metal and easier to shape. Thus, not only is the shell support 150, partially made of plastic or resin, lighter than the shroud support of prior art, but additionally it improves cooling by guiding the air flow towards to the rotor 140. Furthermore, the aeraulic element being made of plastic or resin allows the clearance between the flanged edge 173 and the band 144 to be optimised such that the interlocking of the aeraulic element 170 on the rotor 140 is adjusted and, thus, noise due to the operating clearance is avoided.

Moreover, making the shroud support 150 in two parts provides an additional advantage: in the event of a violent impact, the aeraulic element 170 and the rotor 140 can come into contact with each other without risk of breakage. As both parts are made of plastic or resin, the risk of rotor breakage is lower than in current ventilation systems where the rotor collides with a metal shroud support. In addition, during maintenance of the aircraft, it is possible to change only one of the two parts, thus limiting maintenance costs.

In some embodiments, such as that represented in FIGS. 7 and 8, the aeraulic element 170 and the external ring 162 of the structural element 160 may each include a radial opening 152, facing each other, to allow the passage of a cable for example for checking tyre pressure, the edges 152*a*, 152*b* of the opening of the external ring 162 being connected by a staple 153.

Figure 5:
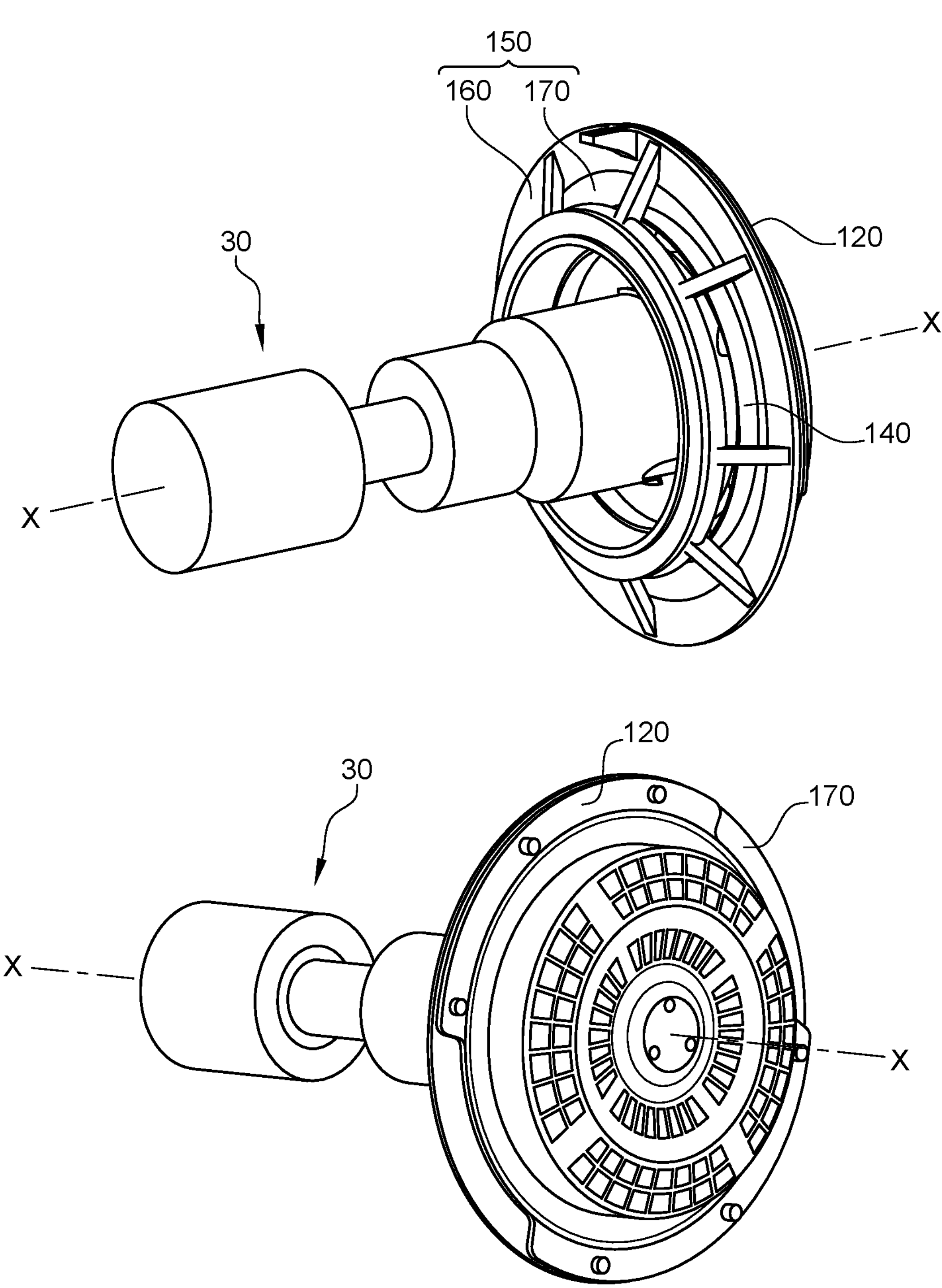
FIG. 5 represents a front perspective view and a rear perspective view of the ventilation system according to the invention, mounted to an electric motor.
Figure 9:
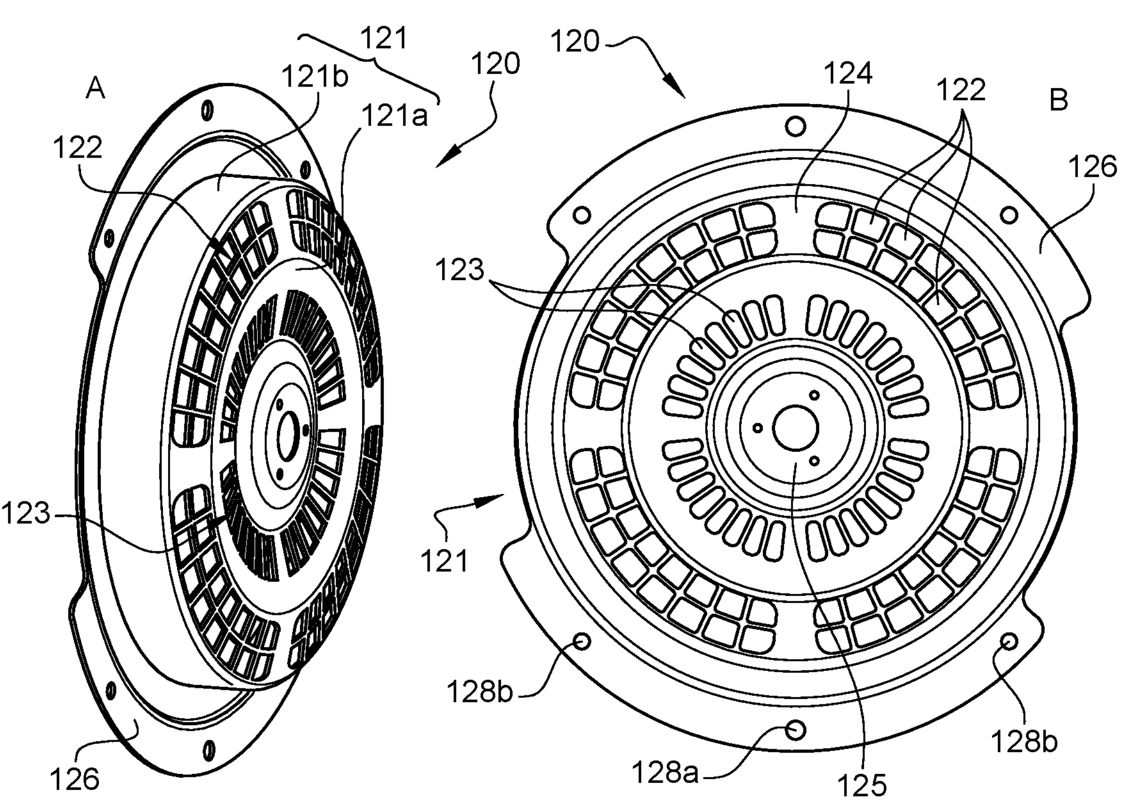
FIG. 9 represents a side view and a front view of the guard grid according to the invention.

As represented in FIGS. 5 and 6, the rotor 140 is housed between the shell support 150, just described, and the guard grid 120. The guard grid 120, an example of which is represented in a side view (drawing A) and a front view (drawing B) in FIG. 9, includes a shell 121 made of sheet metal, provided with a first and a second set of ports 122, 123. The shell 121 has a substantially bowl-like shape with a circular bottom 121*a* which extends in a radial plane and an edge 121*b* which extends axially over the circumference of the bottom 121*a*.

The edge 121*b* of the shell 121 includes a substantially planar outer face, that is, without asperities, so as to optimise the aeraulic flow of the guard grid 120. Furthermore, it includes an inner face which extends circumferentially facing the labyrinth 145 of the rotor 140. This inner face of the edge 121*b* may include one or more crenelations complementary in shape to the crenelation(s) of the external surface 144*b* of the band 144 such that together they form a barrier to the air flow. Impeding circulation of the air flow between the rotor 140 and the guard grid 120 externally to the rotor 140 not only optimizes the air flow internally to the rotor, but also decreases the noise level generated by the air circulation.

The bottom 121*a* of the shell 121 is provided with a first set of ports 122 and a second set of ports 123. The ports in the first set of ports 122 face the blades 143 of the rotor and are adapted to let the air flow pass. These ports are as large as possible so as to let a maximum amount of air pass. Each port of the first set of ports 122 may, for example, be substantially square in shape. The spacer arms between two consecutive ports are chosen to be as thin as possible so as to limit the noise level generated by the airflow over these spacer arms. Indeed, the more discreet the spacer arms, the less obstruction there is to the aeraulic flow and therefore the less noise the air flow generates.

The ports 123 of the second set of ports are housed in the central zone of the bottom 121*a* and adapted to reduce the mass of the guard grid. These ports 123, positioned for example facing the central hub 141 of the rotor 140, may have an oblong shape for housing a maximum number of ports and thus limiting mass of the guard grid at maximum.

The dimensions of the ports and the dimensions of the spaces between ports are determined as a function of the thickness of the sheet metal forming the shell 121. In order to limit mass of the ventilation system at maximum, the sheet metal of the shell 121 is chosen to be as thin as possible, for example 2.5 mm thick. For a very thin sheet, for example 2.5 mm, reinforcements 124 between the ports 122 of the first set of ports and the ports 123 of the second set of ports can be provided evenly over the circumference of the zone of the shell containing the ports. These reinforcements 124 ensure the strength of the guard grid 120 to allow the shaft 40 to be held in its central zone 125.

The guard grid 120 includes, over its circumference, a raised edge 126 extending axially along the aeraulic element 170 of the shroud support. This raised edge 126 forms a partial ring around the shell 121 for receiving attachment means for attaching the guard grid to the shell support. These attachment means may include, for example, a plurality of holes 128 adapted to receive attachment screws and/or pins.

For example, the central ports 128*a* may be adapted to receive the pins 165 of the shroud support 150 and the off-centre ports 128*b* may be adapted to receive attachment screws or bolts 166.

Figure 10:
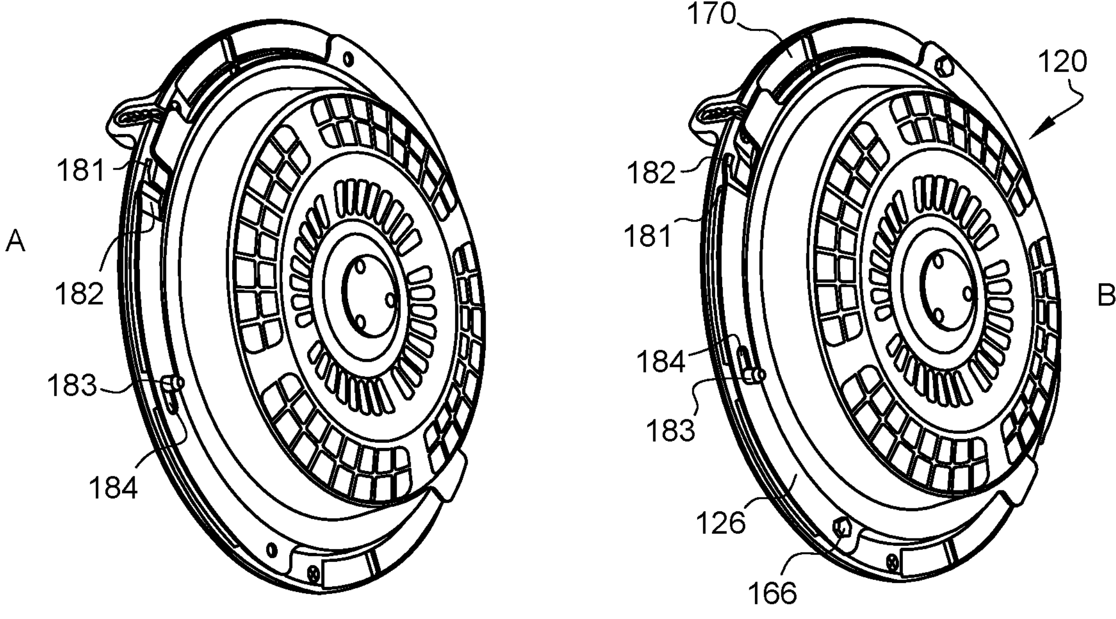
FIG. 10 represents a front perspective view of the ventilation system of FIG. 4 when the latter is fitted with a quarter-turn locking device.

According to some embodiments, the ventilation system includes a quarter-turn locking device 180 for attaching the guard grid 120 to the aeraulic element 170 of the shroud support. An example of a quarter-turn locking device is represented in FIG. 10 in an unlocked position (drawing A) and in a locked position (drawing B). This quarter-turn locking device 180, more simply referred to as a locking device, includes a notch 181 made on the second face 172 of the aeraulic element 170 and a tongue 182 made on the raised edge 126 of the guard grid 120, said tongue 182 being capable of interlocking into the notch 181. The locking device 180 may also include one or more sets of pins 183 and oblong ports 184 distributed over the circumference of the guard grid 120 and the aeraulic element 170 to facilitate mounting the guard grid 120 against the aeraulic element 170. In this alternative, the pin 183 may protrude from the aeraulic element 170 or from the structural element 160 via an aperture in the aeraulic element, the pin of the locking device 180 may then be the pin 165 previously described. This quarter-turn locking device 180 makes it possible, by a simple rotation, to lock or unlock the guard grid. One or two screws or bolts 166 may supplement the locking device 180 and be mounted through the guard grid 120, the aeraulic element 170 and the structural element 160 for safety reasons, especially due to the vibrations experienced by the ventilation system. Even with one or two screws or bolts 185, this guard grid 120 is much easier to assemble and disassemble than the guard grid of prior art which requires the screwing/unscrewing of nine bolts. This embodiment of the guard grid allows a significant saving of time during the assembly or disassembly (for example during the maintenance phase) of the guard grid and limits the risks of losing the screws and/or bolts.

Figure 11:
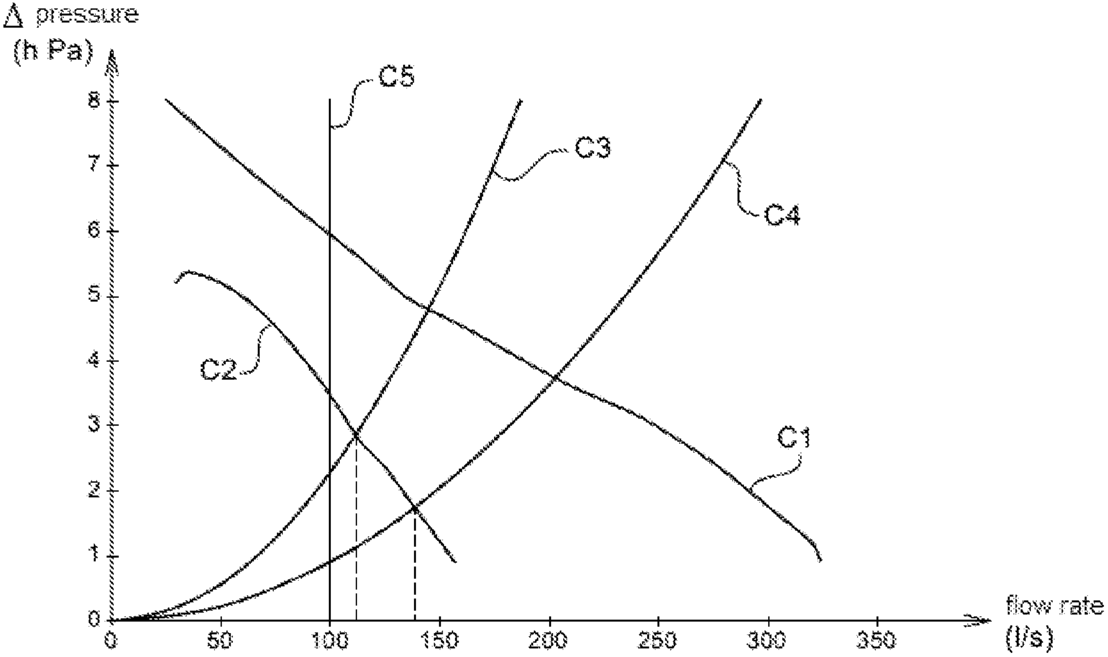
FIG. 11 represents a comparison of performance curves of the ventilation system according to the invention and the ventilation system of prior art.

FIG. 11 represents examples of curves showing the air flow rate supplied by the ventilation system to a wheel assembly according to prior art and according to the invention. These curves are represented in a frame of reference where the abscissa axis corresponds to the air flow rate through the ventilation system and the coordinate axis corresponds to the pressure rise generated by the ventilation system. Curves C3 and C4 show the actual performance of a single-aisle aircraft of the old and new generation respectively. Curve C5 shows the air requirements of these aircraft. Curve C1 shows the pressure rise of the ventilation system according to prior art. Curve C2 shows the pressure rise of the ventilation system according to the invention. The intersection of the curves C2 with C3 or C4 shows that the ventilation system according to the invention allows an air flow rate of about 110 and 140 litres respectively, which is above the air requirement of 100 litres (curve C5) of these aircraft. The ventilation system of the invention can therefore be installed on any single-aisle aircraft. Thus, this ventilation system, which reduces the intrinsic noise level to about 85 dB (which corresponds to about 80 dB at the periphery of the aircraft), provides a sufficient air flow rate for the needs of the aircraft, without increasing its mass.

Although described through a number of examples, alternatives and embodiments, the aircraft wheel ventilation system according to the invention comprises various alternatives, modifications and improvements which will be obvious to the person skilled in the art, it being understood that these alternatives, modifications and improvements are within the scope of the invention.

The invention claimed is:

1. A ventilation system for mounting in an aircraft wheel along a central axis and including a rotor fitted with a plurality of blades and housed between a shroud support and a guard grid, the shroud support and the guard grid being mounted to either side of the rotor along said central axis, the shroud support being located internally to the wheel, wherein the shroud support includes a structural element juxtaposed with an aeraulic element, the structural element being made of metal and adapted to interlock into the wheel and support the rotor, the aeraulic element comprising a flattened crown shape comprising, at its centre, a flanged edge fitting at least partially around a band of the rotor, said aeraulic element being made of plastic or resin and adapted to direct an air flow towards to the rotor.

2. The ventilation system according to claim 1, wherein the band of the rotor extends circularly at a radial end of the blades and includes a crenelated surface capable of impeding passage of air flow, said crenelated surface including at least one crenelation.

3. The ventilation system according to claim 1, wherein the structural element and the aeraulic element of the shroud support are integral with each other.

4. The ventilation system according to claim 1, wherein the structural element includes an internal ring, an external ring and a plurality of arms distributed over a circumference of the internal ring and connecting the internal ring to the external ring, the internal and external rings and the arms including rounded contours free of ridges.

5. The ventilation system according to claim 4, wherein the aeraulic element includes a first, substantially planar, face capable of being joined to the external ring of the structural element.

6. The ventilation system according to claim 1, wherein the guard grid includes a shell provided with a first and a second set of ports, the first set of ports facing the blades of the rotor and being adapted to let the air flow pass, the second set of ports facing a hub of the rotor and being adapted to reduce the mass of the guard grid.

7. The ventilation system of claim 6, wherein the guard grid includes a raised edge extending axially at an outer end of the shell, said raised edge including attachment means for attaching said guard grid to the shroud support.

8. The ventilation system of claim 7, further comprising a quarter-turn locking device mounted to the guard grid and the aeraulic element for attaching said guard grid to the aeraulic element of the shroud support.

9. A wheel assembly, comprising:

the wheel mounted to the rim and positioned about the central axis, a device for braking the wheel, and the ventilation system according to claim 1 disposed along the central axis for cooling the braking device by circulating an air flow.

10. The wheel assembly according to claim 9, wherein the structural element of the shroud support is integral with the rim of the wheel.

* * * * *